Dec. 9, 1969   W. E. LEHMAN ET AL   3,482,824
PREPARATION OF ASPHALT PAVING MATERIAL
Filed Aug. 2, 1967   2 Sheets-Sheet 1

INVENTORS
WILLIAM E. LEHMAN
BILLY D. MEADE
JOHN P. FEATHERSTON
BY W. E. Sherwood
ATTORNEY

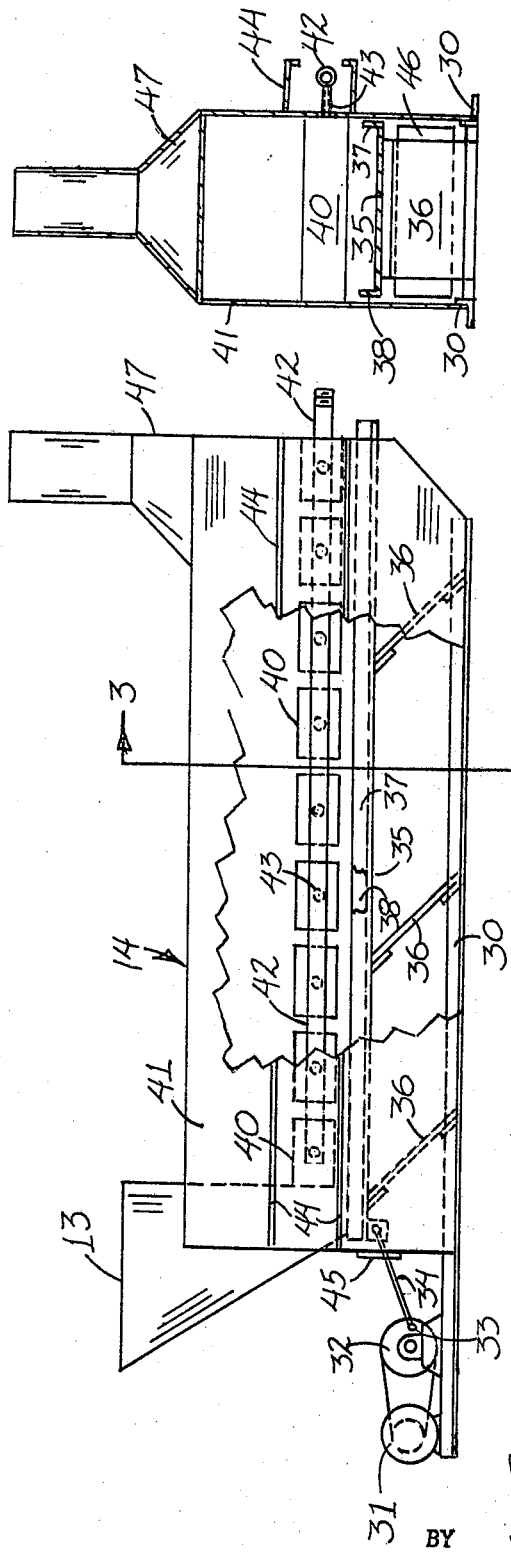

United States Patent Office 3,482,824
Patented Dec. 9, 1969

3,482,824
PREPARATION OF ASPHALT PAVING MATERIAL
William E. Lehman, Lexington, Ky., Billy D. Meade, 329 Kingsway Drive, Lexington, Ky. 40502, and John P. Featherston, Lexington, Ky.; said Lehman and said Featherston assignors to said Meade
Filed Aug. 2, 1967, Ser. No. 657,801
Int. Cl. B28c 5/46
U.S. Cl. 259—148       6 Claims

ABSTRACT OF THE DISCLOSURE

A method and apparatus for preparation of asphalt paving material employing infra-red radiant heat for drying of the solid materials. The equipment and its operation is characterized by the relatively small amount of dust and gases released to the ambient atmosphere.

BACKGROUND OF THE INVENTION

Field of the invention

The invention relates to the preparation of asphalt paving material comprising a mixture of dried solid materials, coated with asphalt, and particularly to the drying and handling of the materials in such a way that a greatly reduced amount of particulate and gaseous waste effluent is produced. The combination of apparatus of the invention is coordinated to employ to the full the advantageous characteristics of infra-red radiant heating and to eliminate noisy, dust-producing apparatus found in conventional preparation plants.

Description of the prior art

Conventional asphalt paving material preparation plants employ large rotary driers mounted on an inclined axis and with flights which tumble the solid materials passing therethrough. These materials comprising sand, stone, and stone screenings are subjected to contact with air heated by a gas flame. Such air is forced at high velocity into contact with the materials being tumbled and dried, and with the result that large quantities of products of combustion, evolved moisture from the solid materials, and dust produced by the tumbling action have to be treated as a waste effluent from the process. Usually, all of the solid materials pass through the same drier and a subsequent screening step is involved and which gives rise to even more dust requiring an appropriate disposition. Moreover, the exhaust gases from the drier still contain an appreciable amount of heat which is wasted and the volume of gas which has to be heated in order to dry the materials reaches substantial proportions. It is a purpose of the present invention to overcome these and other problems found in the conventional plant apparatus.

SUMMARY OF THE INVENTION

The method of preparing the asphalt paving material and the combination of coordinated apparatus with which the method is practiced serves to reduce substantially the pollution of the atmosphere adjacent the preparation plant. At the same time a significant savings in the amount of heat rejected to the atmosphere is obtained. The invention employs gas-fired, infra-red heating in separate enclosures in which the respective solid materials are dried and the heat rays are directed upon the upper surface of an agitated bed of the solid materials as it is moved through the drying step. Smaller volumes of gas effluent are produced during drying of the materials since air is not employed as the agent for transferring heat from the heating source to the solid material. The customary screening of dried materials as to size while passing from the drying stage to the storage stage in readiness for mixing with asphalt is not necessary, and thus the conventional generation of dust clouds associated with such a screening action is obviated as a result of the coordination of the apparatus of the invention.

BRIEF DESCRIPTION OF THE DRAWINGS

The objects of the invention will be more apparent when considered in conjunction with the following description and the accompanying drawings in which:

FIG. 2 is a side elevation view with parts broken away, of one of the drier units, and FIG. 3 is a sectional view taken on line 3—3 of FIG. 2.

DESCRIPTION OF THE PREFERRED EMBODIMENT

Figure 1:
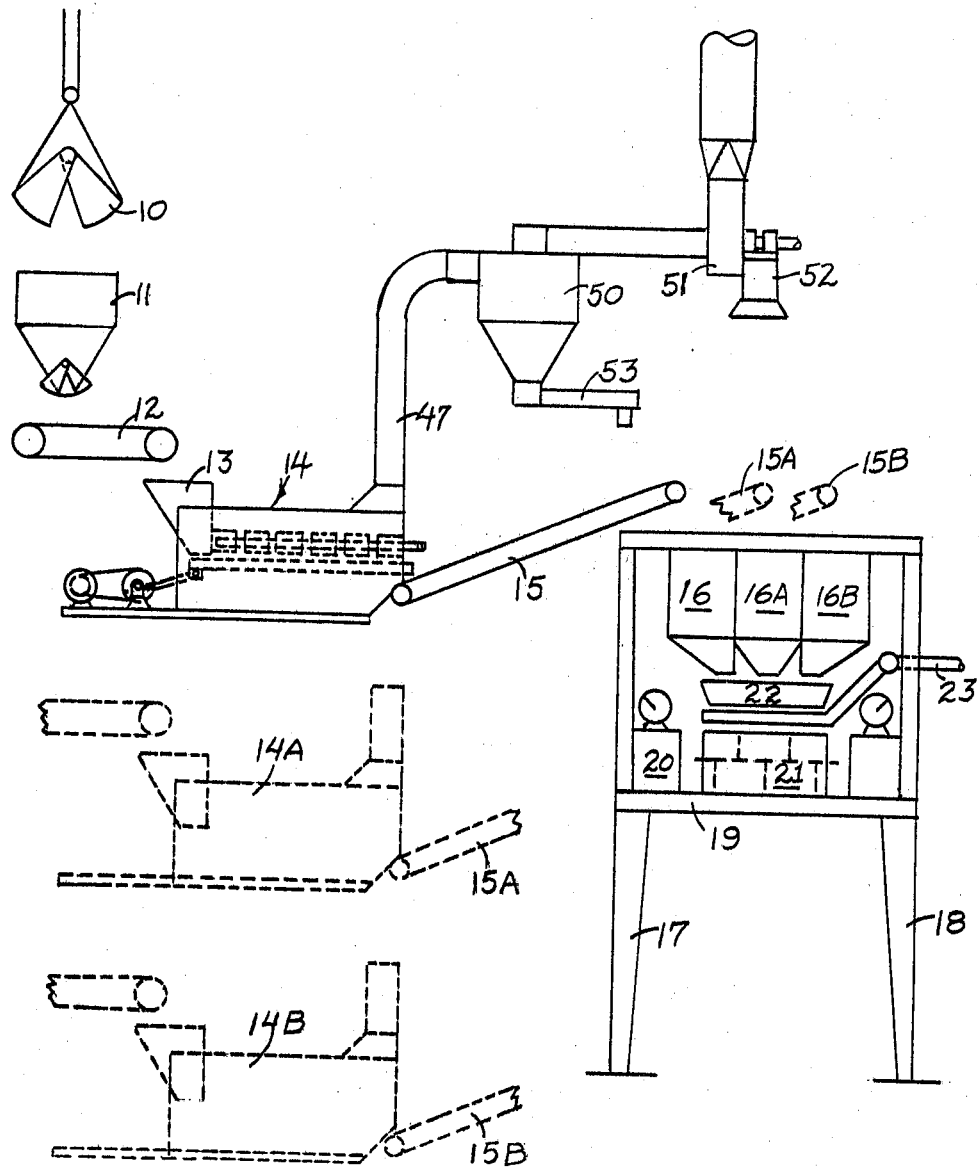
FIG. 1 is a schematic view of an asphalt paving preparation plant showing coordinated apparatus embodying the invention.

Referring first to FIG. 1, a preparation plant embodying the invention and showing the treatment of one of the solid materials, for example the stone material, is depicted; it being understood that the remaining solid materials are to be treated in similar manner. By means of a clam-shell bucket 10 the stone is lifted from a storage pile and deposited in an overhead bin 11 from which it is released in a controlled manner upon a transfer conveyor 12 and dropped into the inlet hopper 13 of the drying unit shown generally at 14 and constituting a significant feature of the invention.

After being heated to a temperature of not less than about 150° F., and not more than about 400° F., the stone is deposited upon an elongated transfer conveyor 15 and dropped into a storage bin 16 near the top of the framework which supports the mixing and dispensing apparatus for preparing the asphalt paving material. As is customary, this framework is supported on pedestals such as 17, 18 between which a truck can be located to receive the paving material. These pedestals support platform 19 on which weighing means 20, mixer means 21, weigh pan 22, liquid asphalt conduit 23 and associated apparatus, all of which are conventional and form no part of the present invention, are located.

Similarly, a storage bin 16A fed by a conveyor 15A transporting dried sand from the drying unit 14A and a storage bin 16B fed by a conveyor 15B transporting dried stone screenings from the drying unit 14B are located adjacent the bins 16 for the dried stone. As in the case of the stone, the sand and the stone screenings likewise have been heated to a temperature of not less than about 150° F. and not more than about 400° F. by the time they leaves their respective drying units. At this point it will be noted that the coordinated apparatus as described obviates the usual requirements for screening of the materials between the time they are dried and the time they are dropped into their storage bins. Omission of the screening of the hot, dried materials thus eliminates the formation of large clouds of dust which in conventional apparatus have to be separately treated (or as is often the case are permitted to escape to the ambient atmosphere).

Referring now to FIGS. 2 and 3, the drying unit includes an elongated base plate 30 for a vibratory feeder. Adjacent the inlet end of the dryer the base plate supports a motor 31 driving a pulley 32 to which an eccentric or cam 33 is attached. By a suitable linkage 34 the cam effects a predetermined vibration to the imperforate flat pan 35 which is supported upon the base plate by a plurality of restoring leaf springs 36. This pan which is of metal adequate to withstand the drying heat, also includes shallow side walls 37, 38 and is open at each end. The height of the side walls generally is held as low as practical consistent with retaining the proper depth of bed of the solid material as it is vibrated toward the outlet of the dryer. As will be understood, the pan 35 is substantially horizontal and the movement of the solid material thereon is caused by a rippling action resulting from the restoring action of springs 36 following the shaking of the pan by the eccentric drive. Thus the angle of repose of the solid material on the pan is sufficient to prevent it from sliding too rapidly toward the exit of the dryer and adequate heating can occur in a comparatively short distance of travel of the material, and while a changing layer of material surface exposed to the heat rays is also being provided. As will be understood, other apparatus for agitating and moving the material through the drying stage may be employed without departing from the invention.

Disposed above the pan 35 in an array longitudinally thereof is a plurality of similar infrared heating units 40 each of which is stationary with respect to the vibrating pan and which, as well as the pan, are enclosed by the stationary housing 41 best shown in FIG. 3. These units are adapted to burn a mixture of air and natural, or other combustible gas, and are preferably of the type disclosed in U.S. Patent No. 2,775,294 to G. Schwank. The gaseous fuel is supplied to the respective infra-red heating units from a supply pipe 42 and upon entering the heating units through the respective inlets 43 induces a flow of the necessary air to support combustion. Such air is taken from the exterior of the housing 41 and after being filtered is drawn through intake duct 44 leading to the respective units 40.

As is known, the products of combustion from this type of heating unit comprise essentially carbon dioxide and water vapor and which must be removed from the housing 41 in order to maintain proper operation of the units 40. This, however, represents but a portion of the total gaseous volume which must be removed from that housing since the moisture carried by the incoming stone material must also be removed in the form of vapor and also the ambient air entering the housing through the aperture 45 (FIG. 2) in which linkage 34 extends and through slot 46 (FIG. 3) through which conveyor 15 extends must also be removed. In a preparation plant having a capacity of 120 tons of asphalt paving material per hour, and when employing the above described apparatus, about 4000–5000 cubic feet per minute of gas at an average temperature of about 250° F. leaves the housing 41 through exhaust stack 47. Approximately the same amount of effluent from each of the companion drying units 14A and 14B require disposition.

By contrast, when employing a gas fired rotary drier for a preparation plant of the same capacity, about 40,000 c.f.m. of gaseous effluent is produced and in which the gas leaving such drier is at a temperature of about 400° F. and travelling at a velocity appreciably greater than the velocity occurring in exhaust stack 47.

In general, the size of housing 41 for use with the plant capacity illustrated above may comprise about 500 cubic feet with the result that the movement of gaseous effluent therethrough is relatively slow. This is advantageous in that the blow-back of ignition for the gas fired radiant heaters is less likely to occur and also the lifting of fine dust from the bed 35 is reduced. A certain amount of dust, particularly near the outlet end of bed 35, is entrained, however, and is carried into exhaust stack 47. This stack at its upper end feeds into a conventional cyclone separator 50 in which a vacuum is pulled by blower 51 driven by motor 52. The solids removed by the separator 50 are periodically removed by the screw conveyor 53 driven in any suitable manner and the gaseous effluent from blower 51 is directed to any appropriate supplementary cleaning means, not shown, or to the ambient atmosphere. As used therein the step of treating effluent prior to releasing the same comprises the operation of all equipment downstream from the housing 41.

As will be understood, similar apparatus for separately treating the effluents from each of drying units 14A for the sand and 14B for the stone screenings are provided and also overhead bins and transfer conveyors similar to those shown at 11 and 12 are provided for each of such drying units. Any suitable controls for releasing materials from the respective overhead bins, for regulating the speed of the transfer conveyors, for regulating the speed of the motors 31, for regulating the feed of gas to the infrared burner, for regulating the speed of output conveyors 15 and for regulating the speed of blowers 51 may be employed. It is, however, a feature of the invention that the apparatus for handling any one of the solid materials can be controlled independently of the apparatus for the other solid materials.

In the manufacture of asphalt paving materials the specifications with which the product must comply generally require that the solid materials be heated to temperatures at which all free moisture will be removed, but at which water of crystallization will not be removed, but at which that the raw materials already are completely dry, a reduced amount of heat can be applied and the throughput of the drying unit can be increased, but for safety purposes the present process heats the solid materials to not less than 150° F. before they leave the driers. In order to avoid excessive overheating of the materials, the process also limits the heating of the materials to not more than 400° F. While some heat may be transmitted by conduction from the metal pans 35 to the solid materials, essentially these materials receive their heat by direct radiation from the heating units and such heat rays are in the infra-red rather than in the visible spectrum. In contrast to the heating of air by direct contact with a gas flame as in the rotary drier, the gaseous effluent leaving the present apparatus through exhaust stack 47 receives most of its heat from the water vapor which is derived from the hot bed of material on the pan 35. A more efficient usage of the fuel is thus effected and at the same time the amount of effluent which is to be treated, is substantially reduced.

Having thus described the method of practicing the invention and the combination of coordinated apparatus by means of which it may be practiced, it will be understood that the invention may also be embodied in other forms within the scope of the appended claims.

What is claimed is:

1. In the manufacture of a paving material comprising a mixture of a plurality of separate solid aggregates and asphalt and requiring drying of the solid aggregates prior to mixing with asphalt, the improvement comprising the steps of separately drying each of said solid aggregates by the application of gas-produced, infra-red radiant heat thereto while moving the same through enclosures which substantiallly prevent escape of dust and gases to the ambient atmosphere, simultaneously agitating said aggregates while passing the same through said enclosures, continuously withdrawing as streams of effluent from said enclosures the evolved moisture from said aggregates together with gases derived from the sources of said radiant heat and dust from the agitated aggregates, and treating said effluents prior to releasing the same to the atmosphere in order to reduce pollution of the atmosphere.

2. In the manufacture of a paving material comprising a mixture of solid aggregates such as sand, stone, stone screenings together with asphalt, the improvement comprising drying each of the solid materials by the application of gas-produced, infra-red radiant heat thereto and while moving the same through an enclosure which substantially prevents escape of dust and gases to the ambient atmosphere, simultaneously agitating the solid materials to cause gravity flow thereof through the enclosure, continuously withdrawing as a stream of effluent from the enclosure the evolved moisture from the solid materials together with gases derived from the heating source and dust from the agitated solid materials, treating said effluent prior to releasing the same to the ambient amosphere, in order to reduce pollution of the atmosphere, passing the dried materials from the drying stage to a mixing stage without intermediate screening of the same as to size, and thereafter mixing the dried solid materials with liquid asphalt to provide the paving material.

3. The method as defined in claim 2 wherein the drying of said solid materials is conducted in separate enclosures respectively.

4. The method as defined in claim 2 wherein each of said solid materials is heated to a temperature of not less than about 150° F. and of not more than about 400° F.

5. Apparatus for drying a plurality of solid aggregates to be used in a paving material and for reducing pollution of the atmosphere comprising, the combination of a separate heating enclosure for each of said aggregates, means for passing undried aggregate into the respective enclosures, means for moving dried aggregate from the respective enclosures, means for agitating the aggregate while passing through the respective enclosures, a gas-fired, infra-red radiant heating source in each of said enclosures and adapted to direct heat rays upon the aggregate passing through said enclosures, means for continuously withdrawing from the respective enclosures streams of effluent including the moisture evolved from the aggregates and the gases derived from the heating sources and dust from the agitated aggregates, and means for treating said effluent streams prior to releasing the same to the ambient atmosphere thereby to reduce pollution of the atmosphere.

6. Apparatus for manufacturing a paving material comprising a mixture of solid aggregates such as sand, stone, stone screenings together with asphalt and including in combination, a separate heating enclosure for each of the respective solid materials, means for passing undried solid materials into the respective enclosures, means for moving the dried solid materials from the respective enclosures to a mixing apparatus and without screening said solid materials as to size while passing from said enclosures to the mixing apparatus, means for mixing liquid asphalt with said solid materials in the mixing apparatus, means for agitating said solid materials within said respective enclosures and for impelling the same through said enclosures, gas-fired, infra-red heating units disposed in each of said respective enclosures and adapted to direct heat rays upon the solid materials passing therethrough, means for continuously withdrawing from the respective enclosures a stream of effluent including the moisture evolved from the solid material and the gases derived from the heating units and dust from the agitated solid materials, and means for treating said effluent prior to releasing the same to the ambient atmosphere in order to reduce pollution of the atmosphere.

References Cited

UNITED STATES PATENTS

| 1,189,772 | 7/1916 | Ammann | 259—156 |
| 1,987,243 | 1/1935 | Madsen | 259—148 |
| 2,192,195 | 3/1940 | Kuhrts | 259—148 |
| 2,533,852 | 12/1950 | Tietig | 259—146 |

ROBERT W. JENKINS, Primary Examiner

U.S. Cl. X.R.
34—39; 259—159